United States Patent
Hofbauer

(10) Patent No.: US 9,482,123 B2
(45) Date of Patent: Nov. 1, 2016

(54) LUBRICATION SYSTEM FOR THE PISTON RING AND CYLINDER LINER OF AN INTERNAL COMBUSTION ENGINE

(75) Inventor: Peter Hofbauer, West Bloomfield, MI (US)

(73) Assignee: EcoMotors, Inc., Allen Park, MI (US)

(*) Notice: Subject to any disclaimer, the term of this patent is extended or adjusted under 35 U.S.C. 154(b) by 1260 days.

(21) Appl. No.: 12/583,916

(22) Filed: Aug. 27, 2009

(65) Prior Publication Data

US 2010/0050978 A1 Mar. 4, 2010

Related U.S. Application Data

(60) Provisional application No. 61/190,290, filed on Aug. 27, 2008.

(51) Int. Cl.
| | |
|---|---|
| *F01M 1/02* | (2006.01) |
| *F01M 11/02* | (2006.01) |
| *F16N 13/18* | (2006.01) |
| *F02B 75/02* | (2006.01) |
| *F01M 11/00* | (2006.01) |
| *F01M 1/08* | (2006.01) |

(52) U.S. Cl.
CPC ............ *F01M 11/02* (2013.01); *F16N 13/18* (2013.01); *F01M 1/02* (2013.01); *F01M 11/0004* (2013.01); *F01M 2001/083* (2013.01); *F01M 2011/022* (2013.01); *F02B 2075/025* (2013.01); *F02B 2075/027* (2013.01)

(58) Field of Classification Search
CPC .... F01M 11/02; F01M 1/02; F01M 11/0004; F02B 2075/027; F02B 2075/025
USPC ...................................... 123/196 R
See application file for complete search history.

(56) References Cited

U.S. PATENT DOCUMENTS

| | | | | |
|---|---|---|---|---|
| 1,304,615 | A | * 5/1919 | Smith | 92/112 |
| 2,166,857 | A | * 7/1939 | Bugatti | 92/156 |
| 2,843,221 | A | 7/1958 | Haring | |
| 3,131,785 | A | 5/1964 | Blank | |
| 3,203,263 | A | * 8/1965 | Gaffney | 74/44 |
| 5,331,928 | A | 7/1994 | Wood | |
| 5,511,523 | A | * 4/1996 | Masuda | 123/196 R |
| 5,743,168 | A | * 4/1998 | Melchior | 92/80 |
| 6,170,443 | B1 | 1/2001 | Hofbauer | |
| 7,509,937 | B2 | 3/2009 | Hofbauer | |
| 2005/0005891 | A1* | 1/2005 | Oh | 123/193.2 |
| 2007/0125323 | A1 | 6/2007 | Hofbauer | |

* cited by examiner

*Primary Examiner* — Lindsay Low
*Assistant Examiner* — Charles Brauch
(74) *Attorney, Agent, or Firm* — Barnes & Thornburg LLP

(57) ABSTRACT

A disclosed lubrication system for an internal combustion engine includes an inertia reactive oil injector in a piston that reacts to convey lubricating oil to the space between the piston and its adjacent cylinder wall immediately below the upper piston rings as the piston reaches top dead center. A first embodiment utilizes a passage and reservoir formed beneath the piston wall with inlet and outlet ports at each end. The oil injector carries the oil past the intake/exhaust ports of the cylinder until the piston decelerates while approaching its TDC position. During that deceleration, the oil carried by the injector reservoir is delivered through the outlet port into the space between the piston and the cylinder liner. A second embodiment utilizes a groove of predetermined length formed in the outer surface of the piston. A reservoir is formed in the groove and defines inlet and outlet ports at each end.

16 Claims, 4 Drawing Sheets

LUBRICATION SYSTEM FOR THE PISTON RING AND CYLINDER LINER OF AN INTERNAL COMBUSTION ENGINE

RELATED APPLICATION

This application claims benefit of U.S. provisional application Ser. No. 61/190,290 filed Aug. 27, 2008.

TECHNICAL FIELD

This invention is related to the field of internal combustion engines and more specifically to a lubrication system that supplies lubricating oil to the piston rings and cylinder liners of 2-cycle engines.

BACKGROUND

Some conventional internal combustion engines are configured to provide lubricating oil that sprays the cylinder walls or piston liners over which the piston rings travel during the stroke cycle of the engine.

In some 2-cycle engines, such as the "Internal combustion engine with a single crankshaft and having opposed cylinders and opposed pistons" ("OPOC engine") described in my U.S. Pat. No. 6,170,443 and incorporated herein by reference, lubricating oil is pumped through passages in the crankshaft and connecting rods to the piston pins. Conventionally, crankcase oil is splashed into the cylinder area below the piston rings to effect wetting of the liner surfaces. In such lubrication systems, the piston rings pick up the lubricating oil as they pass over the wetted liner surfaces and carry it forward as the piston travels from bottom dead center ("BDC") towards top dead center ("TDC"). With each stroke, a small amount of oil is carried past the exhaust and inlet ports of the cylinder.

There is a need to improve the lubrication system as it applies to 2-cycle engines, since if the liner is too wet, the piston rings carry too much oil forward into the scavenging ports and into the combustion chamber. This results in loss of oil through the exhaust ports that can result in HC emissions. Also, the moving of oil past the intake ports causes some oil to be carried into the combustion chamber, which may alter the combustion process. Conversely, if not enough oil is transported to the piston rings, then excessive wear may result.

In my U.S. Patent Publication No. US 2007/0125323 which is incorporated herein by reference, a non-moving oil seal is disclosed that is mounted in the cylinder wall immediately below the exhaust/intake port to ensure both gas and oil tightness.

In my U.S. Pat. No. 7,509,937, which is incorporated herein by reference, an improved lubrication system is described. In that patent, the system includes an inertia pump within a piston that reacts to changes in inertia of the piston as it reaches TDC. The change in inertia causes the pump to react and force a predetermined measure of oil into the space between the piston and its adjacent cylinder wall immediately below the upper piston rings.

SUMMARY OF THE INVENTION

The present invention provides several improvements to the lubricating systems of 2-cycle engines. Two embodiments are shown which utilize piston inertia to inject the proper amount of oil into the space between the piston cylinder liner and the lower piston ring of the upper set of piston rings near the piston crown as the piston is completing its compression stroke on its way to reaching TDC. This point of injecting lubricating oil effectively lubricates the cylinder liner wall at the top area of the travel of the piston rings above the intake and exhaust ports and allows the injected lubricating oil to be drawn down the liner walls in a controlled manner.

Unlike my prior invention described in U.S. Pat. No. 7,509,937 and referenced above, neither embodiment of the present invention incorporates any movable pump components in the piston. Rather, the present invention relies on the use of a strategically placed oil reservoir(s) within the piston and an outlet in the sidewall of the piston to allow the mass of the oil within the reservoir(s) to force itself through the outlet in reaction to the deceleration of the piston when it approaches its TDC position.

In a first embodiment, an oil injector includes a reservoir formed in an open tunnel passage that runs below the outer sidewall surface of a piston and parallel to the direction of piston reciprocation. The tunnel passage of the oil injector has an oil intake port at one end and an oil outlet port at its other end near the upper end of the piston and just below an upper piston ring. The distance between the intake port and the outlet port of the tunnel passage is determined by the distance between the lower end of a non-moving oil seal mounted in the cylinder wall, such as is shown in Publication No. US 2007/0125323, and the first adjacent cylinder exhaust/intake port above the non-moving oil seal. In this manner, the intake port of the oil injector is blocked by the non-movable oil seal just before its outlet port is exposed to the cylinder exhaust/intake port and prevents pressurized oil from below the non-movable oil seal from escaping from the tunnel passage and into the exhaust/intake cylinder port.

In a second embodiment, an oil injector includes an elongated open groove that is formed into the sidewall of a piston parallel to the direction of reciprocal motion of the piston. The extreme ends of the groove serve as the inlet and outlet ports in direct open communication with a reservoir which is formed in the groove. The reservoir of the oil injector receives a predetermined charge of oil when the input port end is exposed to pressurized lubrication oil at BDC. The reservoir retains the desired amount of oil to be conveyed as the piston moves from BDC towards its TDC position. The oil injector then directs the delivery of oil from the reservoir through the outlet port to the upper cylinder liner sidewall as the piston decelerates during its approach to TDC.

In each embodiment, the number of oil injectors is dependent and selected in accordance with the amount of oil that needs to be delivered at the TDC location and the sizes of the individual reservoirs. In any event, a plurality of reservoirs may be formed equidistance about the circumference of the piston and an open annular oil delivery groove is formed in a plane that intersects each outlet port to provide even distribution of oil from the oil injectors to the cylinder wall.

It is an object of the present invention to provide an improved lubricating system for an internal combustion engine by utilizing a valve-less oil delivery system to convey and then to deliver a predetermined amount of oil between the piston and the piston cylinder liner in response to deceleration of the piston as it approaches its TDC position.

It is another object of the present invention to provide an improved lubricating system for an internal combustion engine by utilizing an inertia reactive delivery system within a piston to deposit a predetermined amount of oil onto the piston cylinder liner at the TDC position of the piston.

It is a further object of the invention to provide an improved lubricating system for an internal combustion engine that operates by piston inertia without any additional moving components.

It is a still further object of the present invention to provide an improved lubricating system that injects a predetermined amount of oil to the wall area of the cylinder liner immediately below the maximum height of movement of upper piston rings as the piston reaches its TDC position.

It is another object of the present invention to provide a plurality of inertia reactive delivery devices in each piston of an internal combustion internal combustion engine to deliver a predetermined amount of lubricating oil to the cylinder liner area below the upper piston rings when the piston reaches its TDC position.

It is another object of the present invention to provide a distribution groove around the upper portion of a piston immediately below the upper piston rings in order to evenly distribute lubrication oil to the cylinder liner wall at the location just below the upper piston rings when the piston reaches its TDC position.

DETAILED DESCRIPTION OF THE INVENTION

While the present invention is summarized above as being applicable for several types of internal combustion engines, it is exemplified herein as being installed in a 2-cycle OPOC engine, such as that shown in my above-referenced U.S. Pat. No. 6,170,443.

For clarification, the use of words "upper" and "lower" as well as "above" and "below" are used herein in a conventional manner with respect to engine components and refer to the relative locations. The word "upper" references that portion of a piston or cylinder located towards the combustion chamber—the highest defined point in the cylinder. The word "lower" references that portion of a piston or cylinder located away from the combustion chamber. The word "above" is an adverb that references elements that are relatively positioned or located in a direction towards the combustion chamber, while the word "below" references elements that are relatively positioned or located in a direction away from the combustion chamber. The combustion chamber being defined as the highest portion of the cylinder and the piston moving upwards towards the combustion chamber during its compression stroke. In the case of an OPOC engine where a single cylinder supports the relative movement of two opposing pistons, references to elements being above or below another are mirror image directions when referring to opposing pistons, since the upward direction for piston movement towards the combustion chamber is opposite for each piston.

Figure 1:
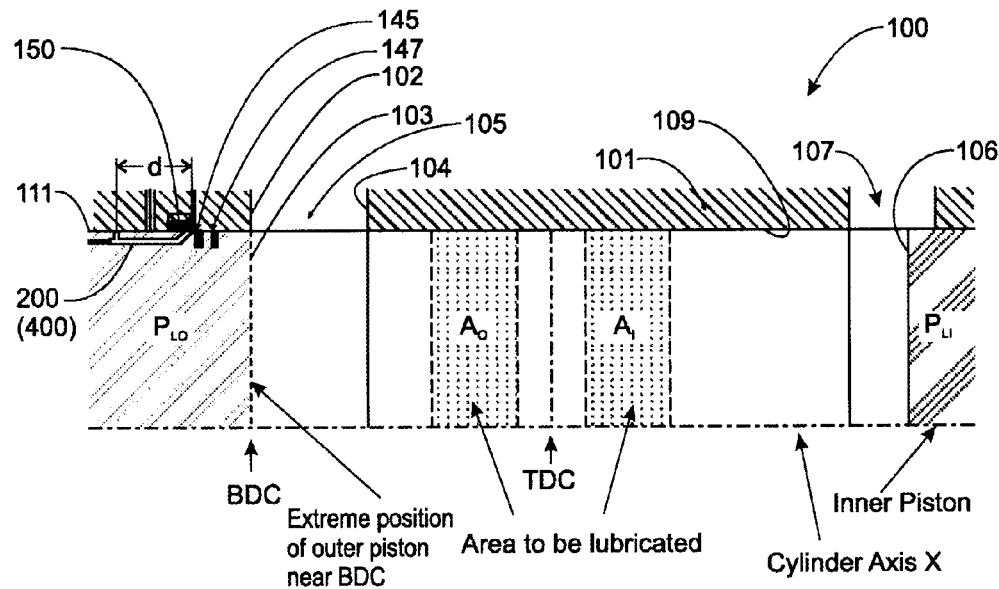
FIG. 1 is an elementary and partial cross-sectional drawing of the left cylinder of a 2-cycle OPOC engine showing the location of the embodiments of the present invention when the outer piston is near its BDC position.

In FIG. 1, a single left cylinder 100 of a multi-cylinder OPOC engine is shown with an outer piston PLO at its BDC position and an inner piston PLI near its BDC position in the cylinder. (In an OPOC engine, the outer and inner pistons reach their respective TDC and BDC positions at slightly different times.) The pistons are mounted for reciprocating motion within the cylinder 100 along a cylinder axis "X" and are connected to a single crankshaft through push rods (inner cylinder) and pull rods (outer cylinder).

Figure 2:
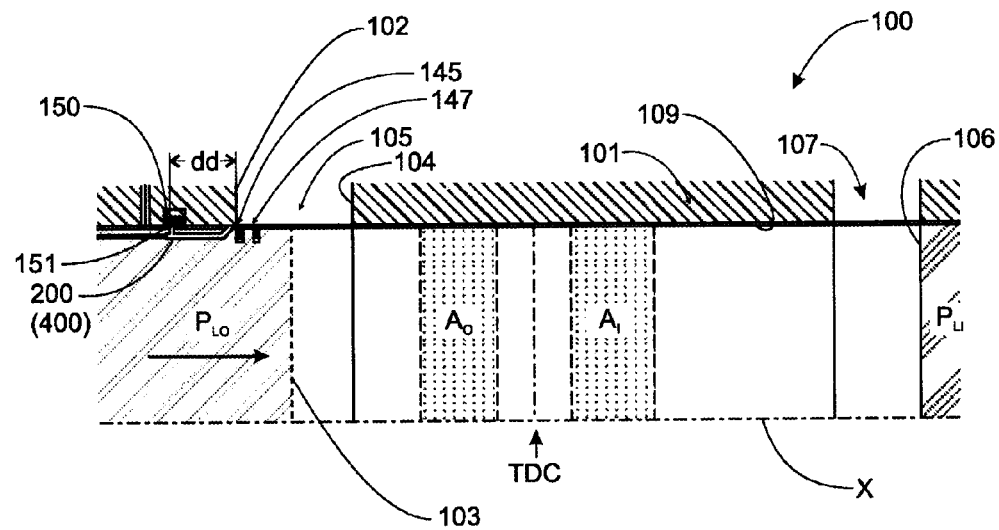
FIG. 2 is a partial cross-sectional drawing of the left cylinder of a 2-cycle OPOC engine as in FIG. 1, while showing the location of the embodiments of the present invention when the outer piston is advancing from its BDC position towards its TDC position and the upper piston rings are sweeping across the cylinder exhaust/intake port.
Figure 3:
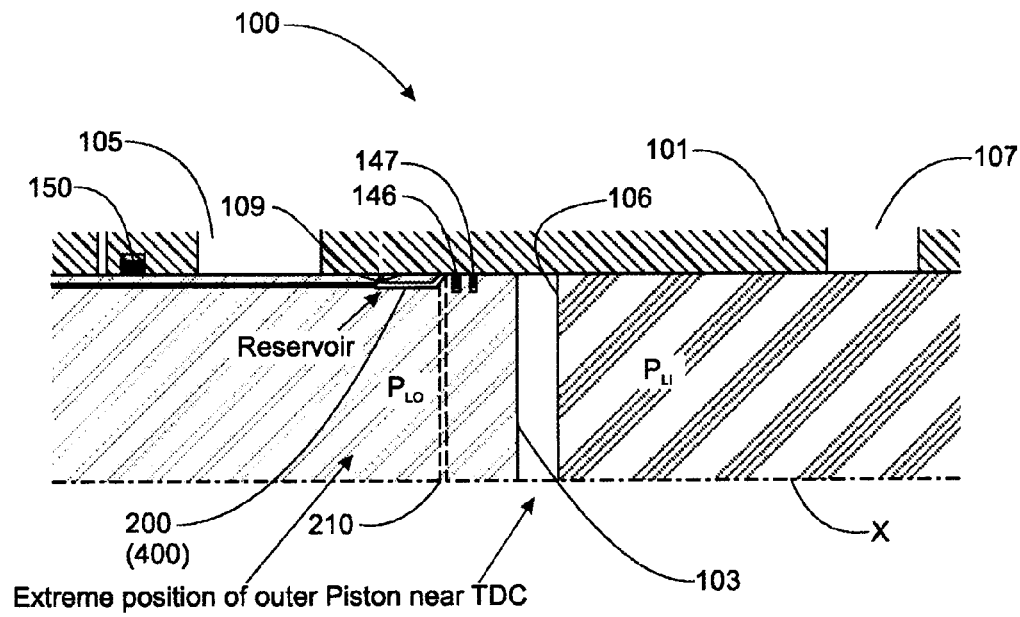
FIG. 3 is a partial cross-sectional drawing of the left cylinder of a 2-cycle OPOC engine as in FIGS. 1 and 2, while showing the location of the embodiments of the present invention when the outer piston has reached its TDC position.

The cylinder 100 includes the intake/exhaust cylinder ports 105 and 107 and a fuel injection port (not shown) normally located near the TDC position. In the Figures, a single set of cylinder ports 105 and 107 are shown, but in a practical application (as shown in the above-referenced U.S. Pat. No. 6,170,443) the intake/exhaust ports are made to encircle the cylinder to provide an efficient means of moving gases to and from the cylinder when the ports are exposed by the pistons during the stroke cycle. Also, FIGS. 1-3 represent the embodiments of the invention (200 and 400) as being located in the left cylinder of an OPOC engine and more precisely in the outer piston (PLO) of the left cylinder. This representation is being made to facilitate the following explanation by eliminating duplicate descriptions, and is not intended to limit the invention to any particular piston. It will be seen that the invention has practical use for many types of internal combustion engines and is so intended.

The cylinder 100 is represented with a horizontally oriented cylinder axis "X" and, for simplicity, the drawings show only the upper half of the piston/cylinder assembly. An inner piston PLI is shown at the right of the cylinder 100 and has an upper face 106. Outer piston PLO is shown at the left and has an upper face 103. A cylinder liner 101 is represented and, of course, surrounds the pistons PLI and PLO in a conventional manner. The detail shown in piston PLO includes a pair of upper piston rings 145 and 147 that are carried in annular grooves formed in the upper end of the piston just below upper face 103. (In reciprocating internal combustion engines, it is common to refer to a portion of the piston that is nearest the combustion chamber as "upper" portion, while that portion of the piston that is more remote from the combustion chamber is referred to as "lower" portion. Directions "above" and "below" are used in conjunction with the upper and lower terms to provide reference with respect thereto, and are not necessarily associated with the vertical. In the case of piston PLO shown in FIG. 1, where PLO is represented to reciprocate along a generally horizontal axis of the cylinder, "upper" is towards the right and "lower" is towards the left.) Piston PLO is represented in FIG. 1 as at its BDC position. Opposing piston PLI is represented as being near its BDC position, but because of delays between the inner and outer pistons inherent in OPOC engines it is either approaching BDC or leaving BDC, depending on the delay configuration.

As mentioned in the summary, the purpose of the invention is to provide a small measure of lubricating oil to the upper portions of the cylinder liner 101 near TDC. The areas of FIG. 1 shown as AO and AI are the upper areas of the cylinder that require such lubrication and are serviced by the invention. Areas AO and AI are defined as those areas just below the upper piston rings on each piston where heat of combustion is severe.

In FIG. 1, the upper face 103 of outer piston PLO is shown as being at its BDC location where cylinder port 105 is fully exposed and at least flush with the outer port face 102 when at BDC. Non-movable oil seal 150 is embedded within cylinder liner 101 and is spring loaded to provide both a gas seal to the upper portion of the cylinder in the space adjacent PLO, and an oil seal to the pressurized lubricating oil located in the lower portion of the cylinder and PLO.

An oil injector 200 is shown as the first embodiment of the present invention in FIG. 1. Its location corresponds to the second embodiment of oil injector 400, as well.

Figure 4:
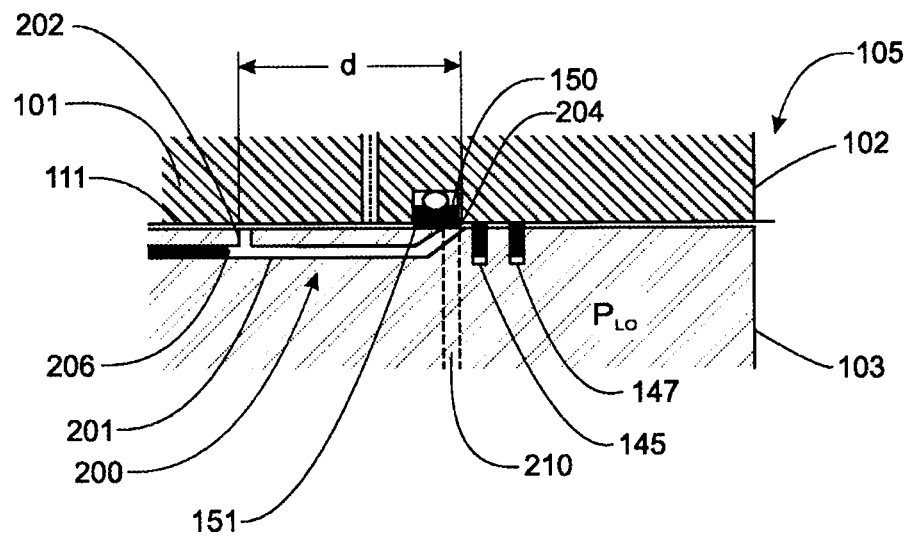
FIG. 4 is an enlarged cross-sectional view of the first embodiment of the present invention corresponding to its location in FIG. 1.

With reference to both FIGS. 1 and 4, the first embodiment of injector 200 can be seen in detail. An elongated tunnel passage 201 is formed as an open bore within piston PLO aligned with the direction of reciprocal motion that the piston follows during its stroke cycles, parallel to axis X. A small reservoir 206 is located at the lower end of passage 201. An inlet port 202 is formed to be in communication between the outer surface of piston PLO and passage 201 as well as reservoir 206. At a distance "d" from the inlet port 202, an outlet port 204 is formed at the opposite end of tunnel passage 201. Outlet port 204 provides communication between passage 201 and the outer surface of piston PLO just below the lower piston ring 145 of the set of upper piston rings 145 and 147. An open annular delivery groove 210 is formed on the outer surface of piston PLO to be coincident with outlet port 204 and just below piston ring 145. Annular delivery groove 210 is in direct communication with outlet port 204 and the output of oil injector 200 from outlet port 204 is provided directly thereto. Annular delivery groove 210 allows oil delivered by oil injector 200 to be distributed around piston PLO in an even fashion.

In FIGS. 1 and 4, the piston PLO is at BDC and the inlet port 202 is exposed to the pressurized oil in space 111 below oil seal 150. During this exposure, lubricating oil enters inlet port 202, reservoir 206, and tunnel passage 201. As piston PLO moves away from its BDC position to the right and towards its TDC position, that interaction with piston rings 145 and 147 and non-movable oil seal 150 creates a vacuum that allows passage 201 to fill with oil until the inlet port 202 moves to a point where it is blocked by non-movable oil seal 150, as shown in FIGS. 2 and 5.

Figure 5:
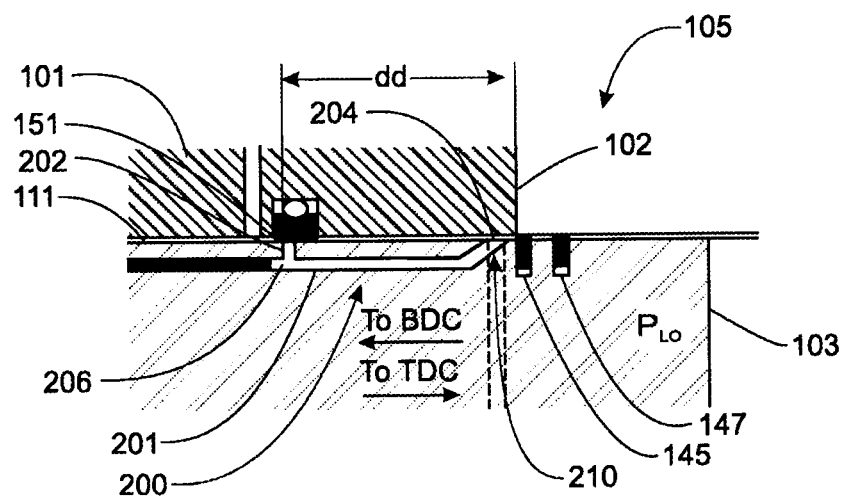
FIG. 5 is an enlarged cross-sectional view of the first embodiment of the present invention corresponding to its location in FIG. 2.

As shown in FIGS. 2 and 5, the piston PLO is away from its BDC position at a point where piston ring 145 is just past outer port face 102 and no longer providing a seal when progressing towards TDC. When outer piston PLO is approaching BDC then a seal is just being established between the piston and the cylinder. For discussion, of oil delivery, it is assumed that in FIGS. 2 and 5, the piston PLO is leaving BDC towards TDC. Therefore, piston ring 147 is past cylinder port face 102 and piston ring 145 is just breaking its seal with the cylinder wall. At this point, injector 200 has its inlet port 202 blocked by the leading edge 151 of non-movable oil seal 150. The distance between the lower piston ring 145 and inlet port 201 is "dd". This is also the distance between the leading edge 151 of non-movable oil seal 150 and intake/exhaust port face 102. From the standpoint of designing oil injector 200, it is important that dimension "d" between inlet port 202 and outlet port 204 be slightly less than "dd" to ensure that there is no occasion where the oil under pressure in space 111 below the non-movable oil seal 150 is in communication with the open intake/exhaust cylinder port 105 through oil injector 200.

In FIG. 3, piston PLO is shown in its TDC position. The oil injector has traveled past the open cylinder port 105 during the stroke towards the TDC position and because there are no significant differences in pressure between inlet port 202 and outlet port 204 during that period of the intake/compression stroke, no oil escapes from oil injector 200. However, as piston PLO nears its TDC position, severe deceleration occurs in the piston and this change in inertia causes the mass of oil present in reservoir 206 and passage 201 to be forced towards outlet port 204, where it enters open annular oil delivery groove 210 and is deposited on the inner surface 109 of cylinder wall 101 in the A0 area. When returning from TDC during the power/exhaust stroke, piston ring 145 wipes the injected oil over the cylinder wall surface and performs the desired lubrication.

As mentioned in the summary, oil injector 200 can be employed in multiples around the piston in order to deliver a more even distribution of oil to the cylinders. This multiple distribution concept is exemplified below with respect to the second embodiment and shown in FIG. 9.

Figure 6:
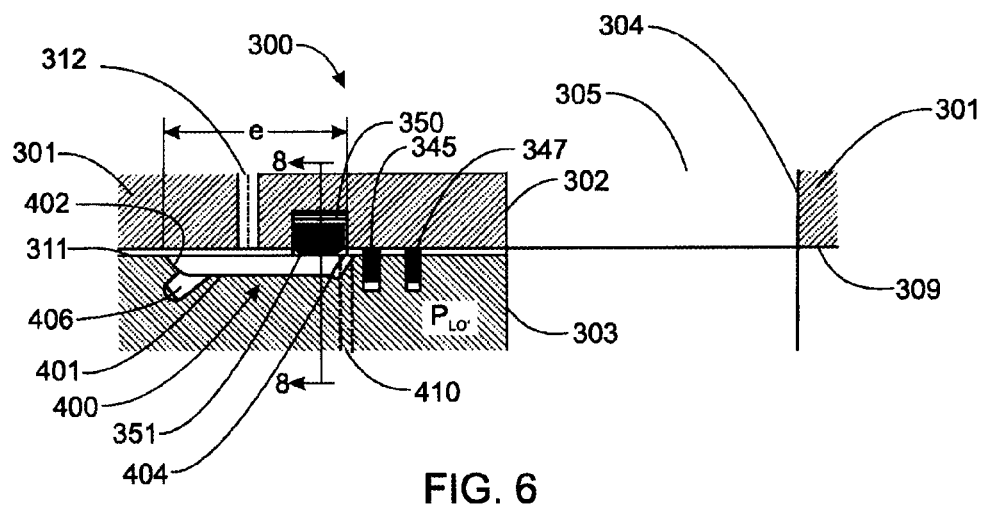
FIG. 6 is an enlarged cross-sectional view of the second embodiment of the present invention corresponding to its location in FIG. 1.
Figure 7:
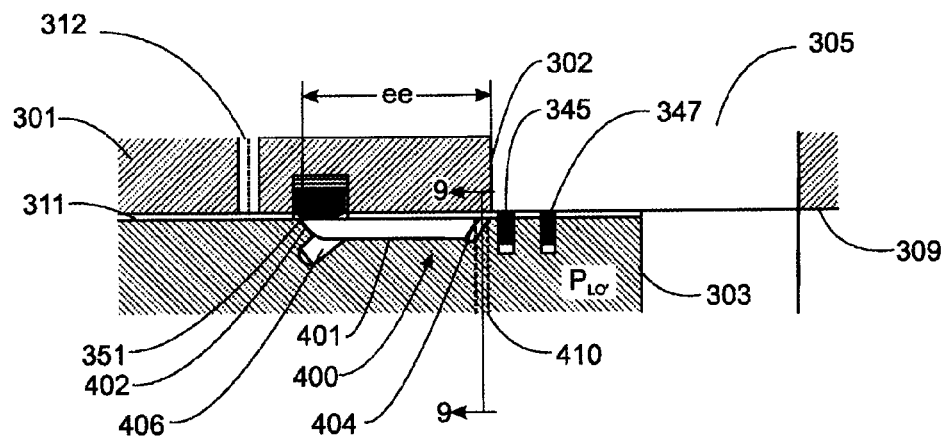
FIG. 7 is an enlarged cross-sectional view of the second embodiment of the present invention corresponding to its location in FIG. 2.

The second embodiment of an oil injector 400 is shown in FIGS. 6 and 7. An elongated open groove passage 401 is formed within piston PLO' to be aligned with the direction of reciprocal motion that the piston follows during its stroke cycles, as in the first embodiment. A small reservoir 406 is located at the lower end of groove passage 401. An inlet port 402 is defined at the extended open limit at the lower end of groove passage 401, to be in communication between the outer surface of piston PLO' and passage 401, as well as reservoir 406. At a distance "e" from the inlet port 402 and at the opposite end of groove passage 401, an outlet port 404 is defined at the extended open limit at the upper end of groove passage 401. Outlet port 404 provides communication between groove passage 401 and the outer surface of piston PLO' just below the lower piston ring 345 of the set of upper piston rings 345 and 347. An annular delivery groove 410 is formed on the outer surface of piston PLO' to be coincident with outlet port 404 and just below piston ring 345. Annular delivery groove 410 is in direct communication with outlet port 404 and the output of oil injector 400 is provided directly thereto. Annular delivery groove 410 allows oil delivered by oil injector 400 to be distributed around piston PLO' in an even fashion.

As in the first embodiment, oil injector 400 is provided so that its distance "e" between its defined inlet port 402 and outlet port 404 is less than the distance "ee" as measured between the leading edge 351 of non-movable oil seal 350 and the wall surface 302 of cylinder port 305.

Figure 8:
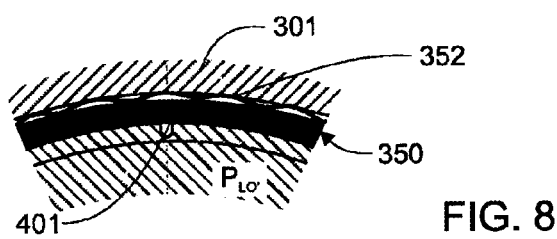
FIG. 8 is a partial cross-sectional view taken along section lines 8-8 in FIG. 6.

FIG. 8 is a partial cross-section of cylinder wall 301, non-movable oil seal 350, groove passage 401 and piston PLO' taken along section line 8-8 in FIG. 6. In this view, the "wavy" spring 352 is shown which provides the bias necessary to engage the non-movable seal 350 during its life.

Figure 9:
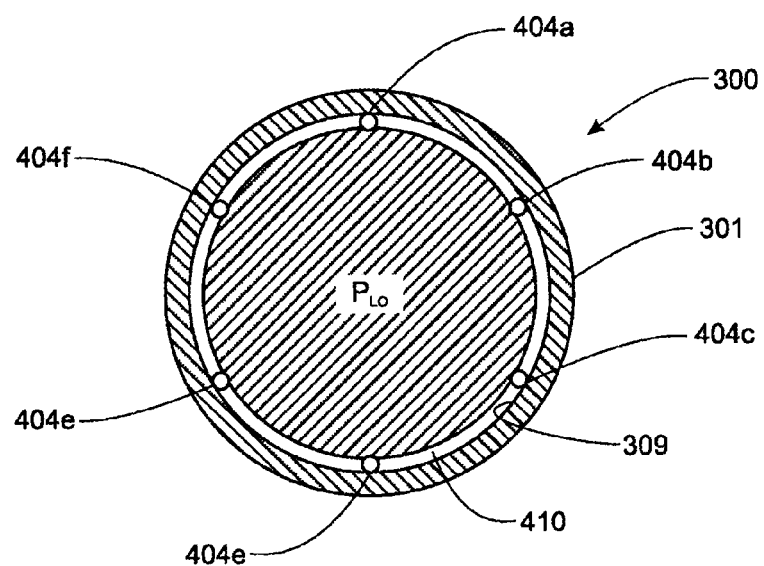
FIG. 9 is a cross-sectional view taken along section lines 9-9 in FIG. 7.

FIG. 9 is a cross-sectional view taken along section line 9-9 in FIG. 7 and shows annular delivery groove 410 in communication with the space adjacent inner wall 309 of cylinder 301. FIG. 9 also shows a possible use of a plurality of oil injectors and their respective outlet ports 404a-404f evenly distributed around piston PLO' in communication with annular delivery groove 410.

I claim:

1. A lubricating system for a cylinder wall of an internal combustion engine, comprising:
   a piston configured for reciprocating longitudinally along an axis within the cylinder wall between a bottom dead center position and a top dead center position, the piston containing an oil injector with an inlet port in an outer surface of a wall of the piston and an outlet port in the outer surface of the piston wall that conveys lubricating oil to the outlet port on the piston wall; and
   an oil reservoir formed within the oil injector that is in direct fluid communication with the inlet port and in direct fluid communication with the outlet port at all times as the piston reciprocates within the cylinder wall between the bottom dead center and the top dead center positions;
   wherein oil in the oil reservoir reacts to deceleration forces of the piston to directly exit the outlet port of the oil injector and provide lubricating oil as the piston reaches the top dead center position.

2. The system as in claim 1, wherein the oil injector includes an oil passage substantially parallel with the axis within the cylinder wall and in direct fluid communication with the inlet port and with the outlet port; wherein the inlet port is at one end of the oil passage to receive oil when the piston is near the bottom dead center position; and wherein the outlet port is at the opposite end of the oil passage and allows oil to exit the oil passage as the piston reaches the top dead center position.

3. The system as in claim 2, wherein the piston has at least two piston rings near an upper end of the piston and the oil injector delivers a predetermined amount of lubricating oil to the cylinder area below the piston rings as the piston reaches the top dead center position.

4. The system as in claim 2, wherein the oil passage is a bore defined within the piston.

5. The system as in claim 2, wherein the oil passage is an open groove formed in the outer surface of the wall of the piston and the inlet and outlet ports are located at the extended open limits of the groove.

6. The system as in claim 3, wherein the piston includes an annular distribution groove around the upper portion of the piston immediately below the at least two piston rings in communication with the outlet port to evenly distribute lubrication oil to the cylinder liner wall at the location just below the at least two piston rings as the piston reaches the top dead center position.

7. The system as in claim 6, wherein the piston contains a plurality of oil injectors distributed about the periphery of the piston, each having outlet ports in communication with the annular groove.

8. A system for providing lubricant to a cylinder wall of an internal combustion engine, comprising:
   a piston configured to reciprocate within the cylinder wall;
   an oil injector provided in the piston, the oil injector comprising:
      a passage defined in the piston and substantially parallel to a central axis of the cylinder wall;
      an inlet port defined in an outer wall of the piston and fluidly coupled to the passage;
      an outlet port defined in the outer wall of the piston and fluidly coupled to the passage wherein the outlet port is located closer to an upper face of the piston than the inlet port;
      a reservoir in fluidic communication with the passage wherein the reservoir is located farther away from the upper face of the piston than the outlet port; and
      an annular oil distribution groove defined in and extending about the outer wall of the piston, wherein the annular oil distribution groove is coincident with the outlet port of the oil injector.

9. The system of claim 8 wherein the passage is one of: defined within the wall of the piston and an open groove formed in the outer wall of the piston.

10. The system of claim 8, further comprising:
    two annular grooves defined in the outer wall of the piston; and
    two piston rings disposed in the annular grooves;
    wherein the two annular grooves for the piston rings are located closer to an upper face of the piston than the annular oil distribution groove.

11. The system of claim 8 further comprising:
    a cylinder port disposed in the cylinder wall for passage of gases through the cylinder wall, wherein a first distance between the inlet and outlet ports is less than a second distance between a leading edge of a stationary oil seal embedded in the cylinder wall and a lower face of the cylinder port.

12. A system for providing lubricant to a cylinder wall of a cylinder in an internal combustion engine, comprising:
    a piston configured to reciprocate within the cylinder;
    an inlet port defined in an outer wall of the piston;
    a passage defined in the piston, the passage having a first end in direct fluid communication with the inlet port and a second end extending away from the first end toward an upper face of the piston;
    an outlet port defined in the outer wall of the piston and in direct fluid communication with the second end of the passage;
    an oil reservoir formed in the piston, the oil reservoir in direct fluid communication with the first end of the passage; and
    lubricating oil between a portion of the outer wall of the piston and the cylinder wall when the piston is near a bottom dead center position within the cylinder;
    wherein the oil reservoir receives the lubricating oil from between the portion of the outer wall of the piston and the cylinder wall via the inlet port when the piston is near the bottom dead center position, and wherein oil in the oil reservoir reacts to deceleration forces of the piston as the piston travels to and reaches a top dead center position within the cylinder to directly exit the outlet port.

13. The system of claim 12 further comprising an annular oil distribution groove defined in and extending about the outer wall of the piston, the annular oil distribution groove coincident with the outlet port;
    wherein the oil exits the outlet port into the annular oil distribution groove.

14. The system of claim 13, further comprising:
    two annular ring grooves defined in the outer wall of the piston; and
    two piston rings disposed in the annular ring grooves;
    wherein the two annular ring grooves are located closer to the upper face of the piston than the annular oil distribution groove;
    and wherein the oil is transferred from the annular oil distribution groove to the cylinder wall and at least one of the two piston rings distributes the oil along the cylinder wall as the piston moves from the top dead center position toward the bottom dead center position.

15. The system as in claim 12, wherein the passage is a bore defined within the piston.

16. The system as in claim 12, wherein the passage is an open groove formed in the outer surface of the wall of the piston and the inlet and outlet ports are located at the extended open limits of the open groove.

\* \* \* \* \*